April 29, 1952   R. L. MAYHEW   2,594,329
GAS GENERATOR
Filed April 30, 1947

INVENTOR.
ROBERT L. MAYHEW
BY
ATTORNEY

Patented Apr. 29, 1952

2,594,329

UNITED STATES PATENT OFFICE 2,594,329

GAS GENERATOR

Robert L. Mayhew, Great Neck, N. Y., assignor to Hydrocarbon Research, Inc., New York, N. Y., a corporation of New Jersey Application April 30, 1947, Serial No. 745,052

3 Claims. (Cl. 48—196)

This invention relates to a gas generator and more particularly to a generator for preparing synthesis gas for synthesis of hydrocarbons, oxygenated compounds and the like.

In the preparation of so-called synthesis gas for synthesis of hydrocarbons, oxygenated compounds and the like, usually consisting essentially of approximately one part carbon monoxide to two parts hydrogen, the gas is preferably prepared by the controlled combustion of a carbonaceous material such as coal, oil or natural gas with substantially pure oxygen, steam being added in some cases, dependent upon the carbonaceous material employed, to obtain the final desired composition. The temperature of the reaction is usually in the order of 2000–2500° F., the gases being discharged at about that temperature. It is desirable to cool the gases to a temperature in the order of 600–650° F. to forestall secondary reactions and to cool the gas to a temperature more suitable for charging to the synthesis reactor or storage facilities.

It is an object of this invention to provide novel means for the prompt cooling of such gases immediately after their generation, substantially all the abstracted heat being conserved for use in other phases of the process.

Another object of the invention is the provision of a novel combined gas generating and cooling means wherein the generator proper and the cooling means are combined in a manner to insure highly efficient heat exchange coupled with adequate protection of the metal elements from the relatively high temperatures encountered.

Another object of the invention is the provision of a novel combined gas generating and cooling means of relatively simple construction wherein the various elements thereof can be readily repaired and/or replaced with a minimum of trouble and expense.

Other objects and advantages of the invention will appear from the following description and claims taken in connection with the attached drawing wherein:

In brief, the present invention may be described as a combined gas generator and cooler. A gas generator and a gas cooler are arranged so that the hot generated gases are discharged into the gas cooler in indirect heat exchange with a cooling medium, the cooled gases being immediately discharged or recirculated about the exterior of the gas cooler and gas generator. The cooling is accomplished by a number of tube assemblies extending into the cooler and substantially floating therein, each tube assembly being formed in a manner to provide separate passageways therein for the flow of the cooling medium to the end of the tube assembly as extended into the gas cooler and back to suitable collecting means. Preferably the tube assemblies are formed as part of a steam generating assembly, the cooling medium preferably being water.

Figure 1:
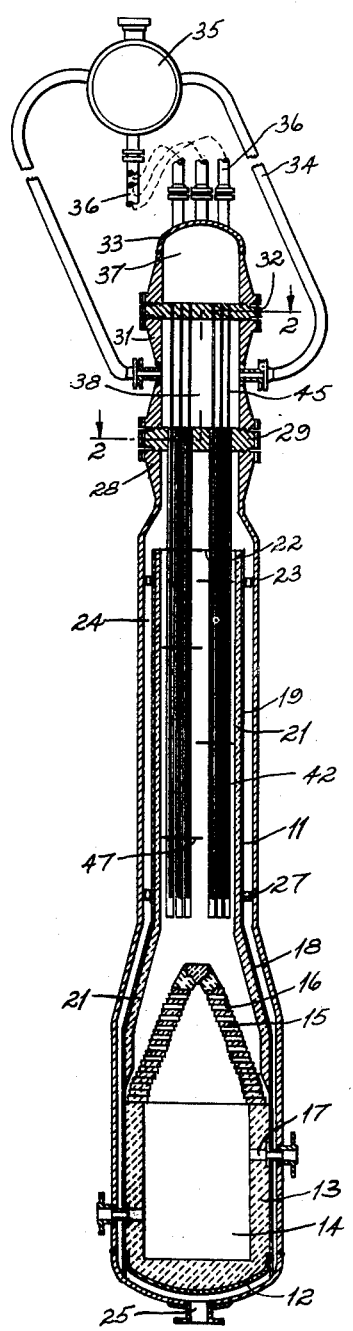
Fig. 1 is a longitudinal section taken through the vertical axis of a preferred embodiment of the invention, a number of the tubes in the cooling section being omitted for the sake of clarity.

Referring to Fig. 1, a shell 11 of a suitable heat resistant metal and preferably of circular cross-section is provided in the general shape shown in section, the shell being relatively elongate. The lower end of shell 11, as viewed in Fig. 1, is closed by a metal wall 12; wall 12 and the lower portion of shell 11 being lined with suitable refractory 13 such as firebrick formed in a manner to define a combustion space 14 of generally cylindrical shape. The upper end of combustion space 14 is built of elements 15 of suitable refractory material which may be arranged in generally conical formation for providing the necessary structural strength and arranged with openings 16 for the discharge of the generated gases. One or more rows of burner ports 17 may be provided for combustion space 14. Where two or more rows are desired, the ports in the different rows are usually staggered to charge the feed gases uniformly into the combustion space. The design of the burners (not shown) will vary with the nature of the fresh material being charged to the combustion space. The discharge end of combustion space 14 may be formed in a number of different ways aside from the conical arrangement of elements 15. The entire discharge end of the combustion space may be left open or only sufficient refractory used to shield the ends of the cooling tubes from direct radiation from the combustion space. The entire lower assembly as viewed in Fig. 1 may be considered the gas generator.

Figure 4:
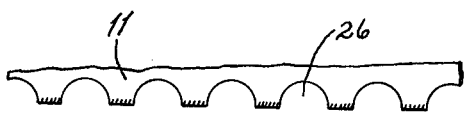
Fig. 4 is a detail of the lower edge of the metal plate surrounding the gas generating section and extending into contact with the adjacent shell.

Above the gas generator, shell 11 is formed with a tapered intermediate section 18 leading into a generally cylindrical section 19, both sections 18 and 19 being lined with a suitable refractory 21. Section 19, termed the gas cooler, terminates at 22 in an open end. A metal shell 23, generally concentric of shell 11 and of a diameter and shape to form an annular space 24 between the outer wall of shell 11 and the inner wall of shell 23, extends about shell 11 and some distance above the upper end thereof, shell 23 being provided with a gas discharge port 25 at its lower end. With reference to Fig. 4, it will be noted that the lower end of the inner metal shell 11 extending into contact with the lower end of shell 23 is provided with a number of suitably sized serrations 26 to permit the flow of gas thereby to discharge port 25.

Preferably spacing elements 27 in the form of small pipe sections are provided between the exterior wall of the interior shell 11 and the interior wall of outer shell 23.

The upper end of shell 23 is formed with a flange 28 suitably grooved as shown to receive a complementary tongue on a tube sheet 29. An open-ended cylinder 31 is provided atop tube sheet 29 and likewise formed with an annular groove to engage a complementary tongue on the top of tube sheet 29. While this arrangement of tongues and grooves affords a satisfactory fluid-tight seal under the usual conditions of operation, gaskets of conventional type may be used if desired. A second tube sheet 32 engages the upper end of cylinder 31 in a similar manner, a cap or housing 33 being mounted on the top of tube sheet 32. The tube sheets, cylinder 31, and housing 33 are all suitably flanged so that they can be readily assembled and disassembled in conventional manner as by bolts.

Cylinder 31 is connected by steam risers 34 to a conventional steam drum 35, downcomers 36 being provided from the bottom of the steam drum to the interior of housing 33. Thus, housing 33 with tube sheet 32 forms a header 37, and cylinder 31 with tube sheets 29 and 32 forms a header 38.

Tube sheet 29 is formed with a number of bores 39 (Fig. 5) preferably provided as shown at 40 with grooves into which tubes 42 are rolled or expanded in well known manner to form tube corrugations 41 engaging grooves 40. It is also advisable to weld the ends of tubes 42 to sheet 29 as shown at 42A.

Tubes 42 extend downwardly into the gas cooler and are entirely free of physical contact with the walls thereof, the tube assembly thus being mounted in a floating phase relative to the gas cooler. Each tube 42 is closed at its lower end as shown at 43 in Fig. 3, each closure 43 being preferably formed with an annular groove 44 defining a central conical deflector for a purpose to be later explained.

Figure 3:
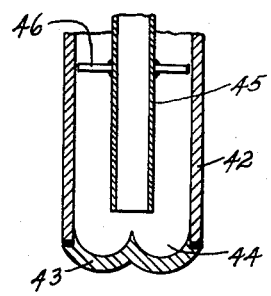
Fig. 3 is a detail taken at the bottom of one of the tube assemblies.
Figure 5:
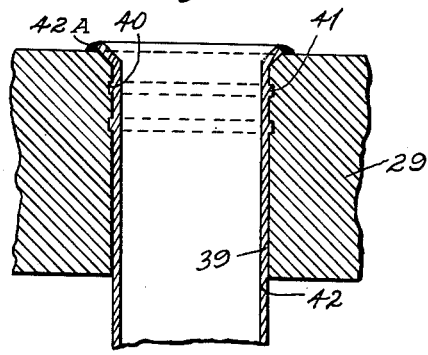
Fig. 5 is a detail of a manner of mounting the individual tubes in the tube sheets.

Tube sheet 32 is aranged to support a number of tubes 45 secured in a manner similar to that shown in Fig. 5 to the tube sheet, one tube 45 being provided for each of tubes 42 and being positioned to extend downwardly within a tube 42 to a point adjacent the bottom thereof as shown in Fig. 3. The lower ends of tubes 45 are open and tubes 45 are preferably mounted in the centers of tubes 42 by means such as pin guides 46. Thus the two tubes define a tube assembly having two separate passageways, the passageways communicating only at the lower ends of the tubes.

To insure the most efficient contact between the gases in the gas cooler and the tube assemblies, a series of staggered baffles 47 are preferably provided at spaced intervals throughout the gas cooler, the baffles preferably being formed of metal capacle of resisting high temperatures and bored to permit the passage of the tubes therethrough. The baffles may be supported upon the tube assembly by spot welds or similar means or the support of the baffles can be left to their frictional contact with the tubes.

Figure 2:
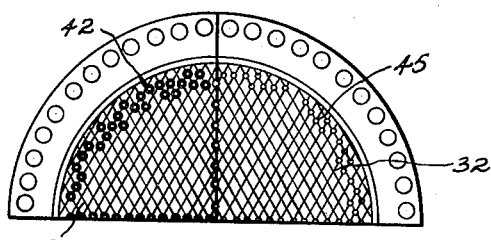
Fig. 2 is a section taken on the line 2—2 of Fig. 1, only one-half the total section being shown.

Preferably the tube assemblies are arranged as shown in Fig. 2, the section being taken through tube sheets 29 and 32. As evident from Fig. 2, the individual tube assemblies are preferably arranged symmetrically throughout the horizontal cross-section of the gas cooler. Thus intimate contact of the gas with the tube assemblies is assured.

In operation, the carbonaceous material and the oxygen with or without steam, as desired, are charged into combustion space 14, the gases reacting therein at a temperature in the range of 2000–2500° F. or even higher and a pressure of approximately 250 pounds per square inch gauge. The hot gases are discharged through passages 16 into the gas cooler wherein they pass into intimate contact with the tube assemblies, the efficiency of the heat transfer therebetween being increased by the arrangement of the tube assemblies and baffles 47. In their discharge from the gas cooler, the gases which are now cooled to a temperature of approximately 600° F. are reversed in direction and caused to pass through the annular space 24 in contact with the metal shell 11 to discharge port 25. Thus the metal shell 11 is maintained at a temperature sufficiently low to withstand the heat of the reaction and the product gases. It will also be noted that the cooled gases are caused to travel around ports 17 for the burners, thereby cooling the burners and extending their lives.

In order that the heat abstracted from the product gases can be substantially conserved and made available for use in other phases of the process, a cooling medium such as water is preferred, the water being fed from steam drum 35 through downcomers 36 into header 37 and tubes 45. In its passage downwardly through tubes 45 and upwardly through tubes 42, the water is converted to steam having a pressure in the order of 675 pounds per square inch gauge, the steam being collected in header 38 and conducted to the steam drum through risers 34. It is to be understood that the steam generating assembly is provided with means for feeding fresh water thereto in conventional manner. By reason of grooves 44 at the bottom of tubes 42 and the central deflectors formed thereby, the travel of the cooling medium through the tubes is facilitated.

If desired, annular space 24 between shells 11 and 23 can be formed as a closed water jacket and water circulated therethrough to effect cooling, the cooled gases then being discharged through a port in shell 23 adjacent the upper end of the gas cooler.

It will be noted that the assembly disclosed herein is of relatively simple construction and capable of being readily disassembled for repair and replacement. The cooling assembly, including the tube assemblies and the headers, are readily removed from the shell 11 thereby rendering the latter easily accessible. The tube assemblies permit ready replacement of tubes as necessary and cleaning when carbon is deposited thereon.

Obviously many modifications and variations of the invention as above set forth may be made without departing from the spirit and scope thereof and only such limitations should be imposed as are indicated in the appended claims.

I claim:

1. A gas generator for the production of carbon monoxide by the interaction of a carbonaceous fuel with oxygen at an elevated pressure which comprises a relatively elongate and substantially vertical cylindrical inner shell closed at its lower end and having a refractory lining; a refractory partition extending across said inner shell dividing it into an enclosed reaction chamber adjacent the lower end of said inner shell and an elongate cooling chamber directly above said reaction chamber, said cooling chamber being open at its upper extremity; reactant inlets in said reaction chamber; an opening in said partition permitting product gas to pass from the reaction chamber to the lower portion of the cooling chamber; a pressure-resistant closed outer shell concentric with said inner shell and spaced around the outer walls of said inner shell to define an annular passage therebetween; an outlet in said outer shell communicating with said annular passage and located adjacent the lower extremity of the outer shell, the open upper extremity of said inner shell communicating with the upper closed end of said outer shell; and means for cooling said gases in the elongate cooling chamber within said inner shell comprising a multiplicity of bayonet heat exchange tubes extending downwardly from the upper extremity of said outer shell into said cooling chamber within the inner shell.

2. A gas generator for the production of carbon monoxide by the interaction of a carbonaceous fuel with oxygen at an elevated pressure which comprises a relatively elongate and substantially vertical cylindrical inner shell closed at its lower end and having a refractory lining; a refractory partition extending across said inner shell dividing it into an enclosed reaction chamber adjacent the lower end of said inner shell and an elongate cooling chamber directly above said reaction chamber, said cooling chamber being open at its upper extremity; reactant inlets in said reaction chamber; an opening in said partition permitting product gas to pass from the reaction chamber to the lower portion of the cooling chamber; a pressure-resistant closed outer shell concentric with said inner shell and spaced around the outer walls of said inner shell to define an annular passage therebetween; an outlet in said outer shell communicating with said annular passage and located adjacent the lower extremity of the outer shell, the open upper extremity of said inner shell communicating with the upper closed end of said outer shell; and means for cooling said gases in the elongate cooling chamber within said inner shell comprising a multiplicity of heat exchange tubes extending downwardly from the upper extremity of said outer shell into said cooling chamber within the inner shell.

3. A gas generator for the production of carbon monoxide by the interaction of a carbonaceous fuel with oxygen at an elevated pressure which comprises a relatively elongate and substantially vertical cylindrical inner shell closed at its lower end and having a refractory lining; a refractory partition extending across said inner shell dividing it into an enclosed reaction chamber adjacent the lower end of said inner shell and an elongate cooling chamber directly above said reaction chamber; reactant inlets in said reaction chamber; an opening in said partition permitting product gas to pass from the reaction chamber to the lower portion of the cooling chamber; a gas outlet from said cooling chamber adjacent the upper extremity of said inner shell; a pressure-resistant closed outer shell concentric with said inner shell and spaced around the outer walls of said inner shell to define an annular passage therebetween; an outlet in said outer shell communicating with said annular passage and located adjacent the lower extremity of the outer shell, the gas outlet at the upper extremity of said inner shell communicating with the upper closed end of said outer shell; and means for cooling said gases in the elongate cooling chamber within said inner shell comprising a multiplicity of vertically disposed heat exchange tubes.

ROBERT L. MAYHEW.

REFERENCES CITED

The following references are of record in the file of this patent:

UNITED STATES PATENTS

| Number | Name | Date |
|---|---|---|
| 83,863 | Laubach | Nov. 10, 1868 |
| 333,691 | Stewart | Jan. 5, 1886 |
| 443,122 | Stevens | Dec. 23, 1890 |
| 447,916 | Stewart | Mar. 10, 1891 |
| 557,189 | Clark | Mar. 31, 1896 |
| 641,656 | Taylor | Jan. 16, 1900 |
| 931,565 | Caygill | Aug. 17, 1909 |
| 1,049,748 | Marischka | Jan. 7, 1913 |
| 1,761,270 | Miller | June 3, 1930 |
| 1,812,080 | Chapman | June 30, 1931 |
| 1,866,399 | De Baufre | July 5, 1932 |
| 1,920,632 | Daniels | Aug. 1, 1933 |
| 1,967,582 | Marischka | July 24, 1934 |
| 2,051,363 | Beekley | Aug. 18, 1936 |
| 2,119,817 | Keller | June 7, 1938 |
| 2,349,439 | Koppers | May 23, 1944 |

FOREIGN PATENTS

| Number | Country | Date |
|---|---|---|
| 2,062 | Great Britain | Feb. 3, 1892 |
| 252,463 | Great Britain | May 1926 |
| 337,388 | Great Britain | Oct. 29, 1930 |

OTHER REFERENCES

Ser. No. 303,852, Szigeth (A. P. C.), published Apr. 27, 1943.